US006424398B1

(12) United States Patent
Taniguchi

(10) Patent No.: US 6,424,398 B1
(45) Date of Patent: Jul. 23, 2002

(54) LIQUID-CRYSTAL DISPLAY

(75) Inventor: Yoji Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/951,204

(22) Filed: Sep. 13, 2001

Related U.S. Application Data

(63) Continuation of application No. PCT/JP00/00448, filed on Jan. 27, 2000.

(30) Foreign Application Priority Data

Mar. 16, 1999 (JP) ............................................. 11-070345

(51) Int. Cl.[7] ..................... G02F 1/1337; G02F 1/1368; G02F 1/139
(52) U.S. Cl. .......................... 349/143; 349/122; 349/178
(58) Field of Search .......................... 349/43, 106, 128, 349/129, 143, 122, 156, 160, 178

(56) References Cited

U.S. PATENT DOCUMENTS

| 5,309,264 | A | | 5/1994 | Lien et al. ..................... 359/87 |
| 5,872,611 | A | | 2/1999 | Hirata et al. .................. 349/147 |
| 6,256,080 | B1 | * | 7/2001 | Colgan et al. ............... 349/129 |
| 6,335,780 | B1 | * | 1/2002 | Kurihara et al. ............ 349/156 |

FOREIGN PATENT DOCUMENTS

| JP | 6-043461 | 2/1994 |
| JP | 636 917 | 2/1995 |
| JP | 7-043719 | 2/1995 |
| JP | 10-301112 | 11/1998 |
| JP | 694 13 624 | 5/1999 |
| JP | 11-258606 | 9/1999 |
| JP | 11-352489 | 12/1999 |
| JP | 2000-098387 | 4/2000 |

* cited by examiner

Primary Examiner—William L. Sikes
Assistant Examiner—Tai V. Duong
(74) Attorney, Agent, or Firm—Greer, Burns & Crain, Ltd.

(57) ABSTRACT

A liquid crystal material having a negative dielectric constant anisotropy is provided between first and second substrates and aligned homeotropically. Pixel electrodes each having a slit are provided on the first substrate. Color filters for giving red, green and blue are arranged in the pixels. A projection pattern is formed on the second substrate so as to divide the pixels into small areas. The slit of each pixel electrode is spaced from the projection pattern so as to divide, together with the projection pattern, the pixels into domains. The width of the slit of a pixel among the red, green, and blue pixels is different from that of the other pixel. The coloring of the display screen occurring during white display is suppressed.

10 Claims, 12 Drawing Sheets

LIQUID-CRYSTAL DISPLAY

This is a continuation of International Application No. PCT/JP00/00448, filed Jan. 27, 2000.

FIELD OF THE INVENTION

The present invention relates to a liquid-crystal display, and in particular, to a color liquid-crystal display in which molecules of liquid crystal are aligned vertically (homeotropically) between two substrates when an electric field is not applied to the liquid crystal molecules and in which each pixel is divided into a plurality of domains.

RELATED ART

FIGS. 10A to 10C are cross-sectional diagrams respectively showing black display, intermediate-tone display, and white display states of a prior-art liquid-crystal display of homeotropic alignment type in which liquid-crystal molecules are aligned homeotropically. A space or gap between a pair of substrates 100 and 101 is filled with liquid-crystal material 102 having a negative dielectric constant anisotropy. Polarizers are disposed respectively on outer surfaces of the substrates 100 and 101 such that polarization axes thereof are orthogonal to each other.

As shown in FIG. 10A, in a state in which a voltage is not applied to the liquid-crystal display, the liquid-crystal molecules 102 are aligned in a direction vertical or orthogonal to the substrates 100 and 101 and hence black display state is achieved. When a voltage is applied across the substrates 100 and 101, the liquid-crystal molecules 102 are aligned in a direction horizontal to the substrates 100 and 101 as shown in FIG. 10C. In this situation, a direction of polarization of light passing the liquid-crystal layer rotates to achieve white display state.

As shown in FIG. 10B, when a voltage lower than that applied for the white display state is applied across the substrates 100 and 101, the liquid-crystal molecules 102 are aligned in an inclined direction with respect to the substrates 100 and 101. A display state of an intermediate tone or color can be obtained by light L1 propagating in a direction vertical to the substrates 100 and 101. For light L2 propagating from a lower-right corner to an upper-left corner in FIG. 10B, an effect of birefringence of the liquid-crystal layer rarely occurs. Therefore, the screen is black when viewed in a direction from the upper-left corner to the lower-right corner. Conversely, for light L3 propagating from a lower-left corner to an upper-right corner in FIG. 10B, the effect of birefringence of the liquid-crystal layer considerably takes place. Therefore, the screen has a color like white when viewed in a direction from the upper-right corner to the lower-left corner. As above, in an ordinary liquid-crystal display of homeotropic type, the visual angle characteristic is lowered in the intermediate-tone display state.

To improve the visual angle characteristic, a liquid-crystal display of multidomain type has been proposed in which each pixel is divided into a plurality of domains. In the display of this type, liquid-crystal molecules are aligned in one direction in each domain in the intermediate-tone display state, and the alignment direction of liquid-crystal molecules in a domain is different from that in the adjacent domains. Referring to FIGS. 11A and 11B, description will be given of an example of a structure and operation of a liquid-crystal display of multidomain and homeotropic type (multidomain, vertically alignment (MVA) type).

FIG. 11A shows a cross section of a liquid-crystal display in a no-voltage state in which a voltage is not applied thereto. A first protrusion pattern 16 is disposed on an inner surface of a glass substrate 1. A second protrusion pattern 18 is disposed on an inner surface of an opposing substrate 36 facing the glass substrate 1. The first and second protrusion patterns 16 and 18 are arranged alternately. On the opposing surfaces of the glass substrate 1 on which a thin-film transistor (TFT) is formed and the opposing substrate 36, vertical alignment films 28 are respectively formed to cover the protrusion patterns 16 and 18. A space between the glass substrate 1 and the opposing substrate 36 is filled with liquid-crystal material 29 including liquid-crystal molecules 30. The molecules 30 have a negative dielectric constant anisotropy. On outer surfaces of the glass substrate 1 and the opposing substrate 36, a polarizer 31 and a polarizer 32 are respectively disposed in a cross-Nicol layout.

In a voltage-applied state in which a voltage is applied to the display, the liquid-crystal molecules are aligned in a direction vertical to the surfaces of the substrates 1 and 36. On inclined surfaces or planes of the first and second protrusion patterns 16 and 18, the liquid-crystal molecules 30a tend to be aligned in a direction vertical to the inclined plane associated therewith. Consequently, these molecules 30a are aligned obliquely with respect to the substrate surfaces. However, since the molecules 30 are aligned in the vertical direction in a wide area of the pixel, black display state is achieved satisfactorily.

FIG. 11B shows a cross-sectional view in an intermediate-tone display state in which a voltage is applied thereto to incline the direction of the liquid-crystal molecules. The liquid-crystal molecules 30a are inclined greater in inclined directions. Liquid-crystal molecules 30 around the inclined molecules 30a are also inclined in the same directions under the influence of the inclination thereof. Therefore, liquid-crystal molecules 30 between the first and second protrusion patterns 16 and 18 are aligned such that a longitudinal axis (a director) of each molecule 30 is aligned in a direction to an upper-right corner of FIG. 11B. Liquid-crystal molecules 30 on the left side of the first protrusion pattern 16 and those on the right side of the left protrusion pattern 18 are aligned such that the director of each molecule 30 is aligned in a direction to a lower-right corner of FIG. 11B.

As above, there are defined in one pixel a plurality of domains. The direction of inclination of liquid-crystal molecules in the domains varies from each other. The first and second protrusion patterns 16 and 18 define boundaries between the domains. By disposing the first and second protrusion patterns 16 and 18 in parallel to the substrate surfaces, two kinds of domains can be defined. By bending each protrusion pattern by 90°, four kinds of domains are defined. When a plurality of domains are defined in each pixel, the visual angle characteristic can be improved in the intermediate-tone display state.

The MVA-type liquid-crystal display obtains white display state using the effect of birefringence of the liquid-crystal material as described for FIG. 10C. Since the effect of birefringence has wavelength dispersion, the transmittance varies among the red (R), green (G), and blue (B) pixels in the white display state. This leads to coloring of the display screen.

FIG. 12 shows a relationship between the transmittance and a cell gap for each of the red, green, and blue pixels. The abscissa represents the cell gap in micrometer ($\mu$m) and the ordinates represents the transmittance in percent (%). The transmittance is an overall transmittance of the entire liquid-crystal panel including the polarizers. The red, green, and blue pixels are equal in an opening ratio to each other. When the cell gap is set to a value from 4 µm to 4.5 µm for which the transmittance of the green pixel takes a maximum value, the transmittance of the blue pixel is lower than those of the red and green pixels. Therefore, the overall display screen becomes yellowish in the white display state.

DESCRIPTION OF THE INVENTION

It is therefore an object of the present invention to provide a liquid-crystal display capable of minimizing the coloring of the display screen in the white display state.

According to one aspect of the present invention, there is provided a liquid-crystal display, comprising a first substrate and a second substrate disposed in parallel to said first substrate with a gap therebetween; liquid-crystal material filled in a space between said first and second substrates, said liquid-crystal material having a negative dielectric constant anisotropy; an alignment film for homeotropically aligning liquid-crystal molecules of said liquid-crystal material in a non-electric field state in which an electric field is not applied to said liquid-crystal material; pixel electrodes formed on an opposing surface of said first substrate, said pixel electrodes defining pixels regularly arranged in a direction of rows and in a direction of columns, each said pixel electrode having a slit therein; a common electrode formed on an opposing surface of said second substrate; a color filter disposed for each said pixel for giving a color of red, green, or blue thereto; and protrusion patterns disposed on said opposing surface of said second substrate, each said protrusion pattern being disposed to divide an area of said pixel into a plurality of sub-areas when viewed in a direction of a normal of said substrates. Said slit of said pixel electrode is disposed apart from said protrusion pattern by a gap when viewed in a direction of a normal of said substrates, said slit and said protrusion patterns divide an area of said pixel into a plurality of domains, and said slits belonging to at least one selected from three groups of red, green, and blue pixels have width different from those of said slits of other pixel groups.

The transmittance is changed by changing the slit width. Using the variation in the transmittance, the difference of transmittance by the wavelength dispersion can be compensated for. By reducing the difference in the transmittance for each color pixel, the coloring of the display screen can be minimized in the white display state.

DESCRIPTION OF THE PREFERRED EMBODIMENTS

Figure 1:
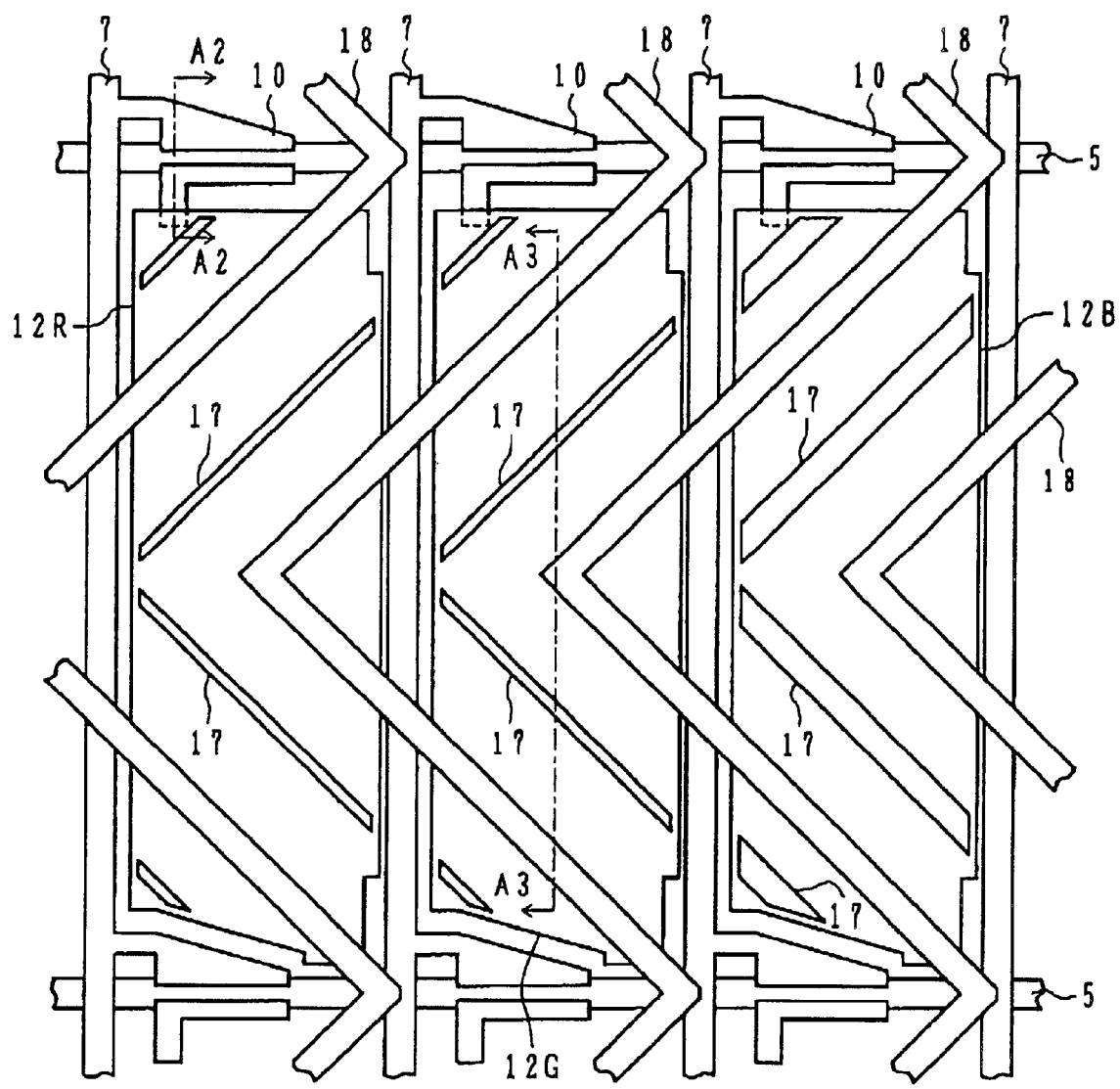
FIG. 1 is a plan view partly showing a liquid-crystal display in a first embodiment.

FIG. 1 shows a plan view of an MVA liquid-crystal display in a first embodiment. On a surface of a glass substrate, a plurality of gate bus lines 5 extend in a row (horizontal) direction in the drawing. The gate bus lines 5 are covered with a gate insulating film, on which a plurality of drain bus lines 7 are arranged to extend in a column (vertical) direction in the drawing.

A thin-film transistor (TFT) 10 is disposed at each of intersections between the gate bus lines 5 and the data bus lines 7. The TFT 10 has a drain electrode connected to an associated one of the drain bus lines 7. The gate bus line 5 also serves as a gate electrode of the associated TFT 10.

The drain bus lines 7 and the TFT's 10 are covered with a protective insulating film. A pixel electrodes 12 are respectively disposed in areas surrounded by adjacent two gate bus lines 50 and adjacent two data bus lines 7. Each electrode 12 is connected to a source electrode of the corresponding TFT 10. A pixel electrode 12R for a red pixel, a pixel electrode 12G for a green pixel, and a pixel electrode 12B for a blue pixel are arranged in the row direction in this order to form one picture element.

An opposing substrate is disposed with a predetermined gap between the opposing substrate and the glass substrate on which the TFT's 10 are thus formed. Protrusion patterns 18 are formed on an opposing surface of the opposing substrate along a zigzag pattern extending in the column direction. The protrusion patterns 18 are equally apart from each other in the row direction. Each pattern 18 is bent by about 90° at an intersecting position between the protrusion pattern 18 and the gate bus line 5 and at a central position between two gate bus lines 5.

A slit 17 is formed in each pixel electrode 12. The slits 17 are arranged along a virtual zigzag pattern obtained by shifting the protrusion pattern 18 in the row direction by a half of the pitch when viewed in the direction of the normal of the substrates. Each pixel electrode 12 is 100 µm long and 300 µm long respectively in the row and column directions. For each of the pixel electrode 12R of a red pixel and the pixel electrode 12G of a green pixel, the slit 17 is 7 µm wide. For the pixel electrode 12B of a blue pixel, the slit 17 is 10 µm wide. The protrusion patterns 18 on the opposing substrate has a width of 10 µm and a height of 1.5 µm.

By the slit 17, there is generated, in its peripheral area, an electric field in an inclined direction with respect to the substrate surfaces. The inclined electric field tilts liquid-crystal molecules in a particular direction. Therefore, like the first protrusion pattern 16 of FIG. 11B, the slit 17 defines a domain boundary.

Figure 2:
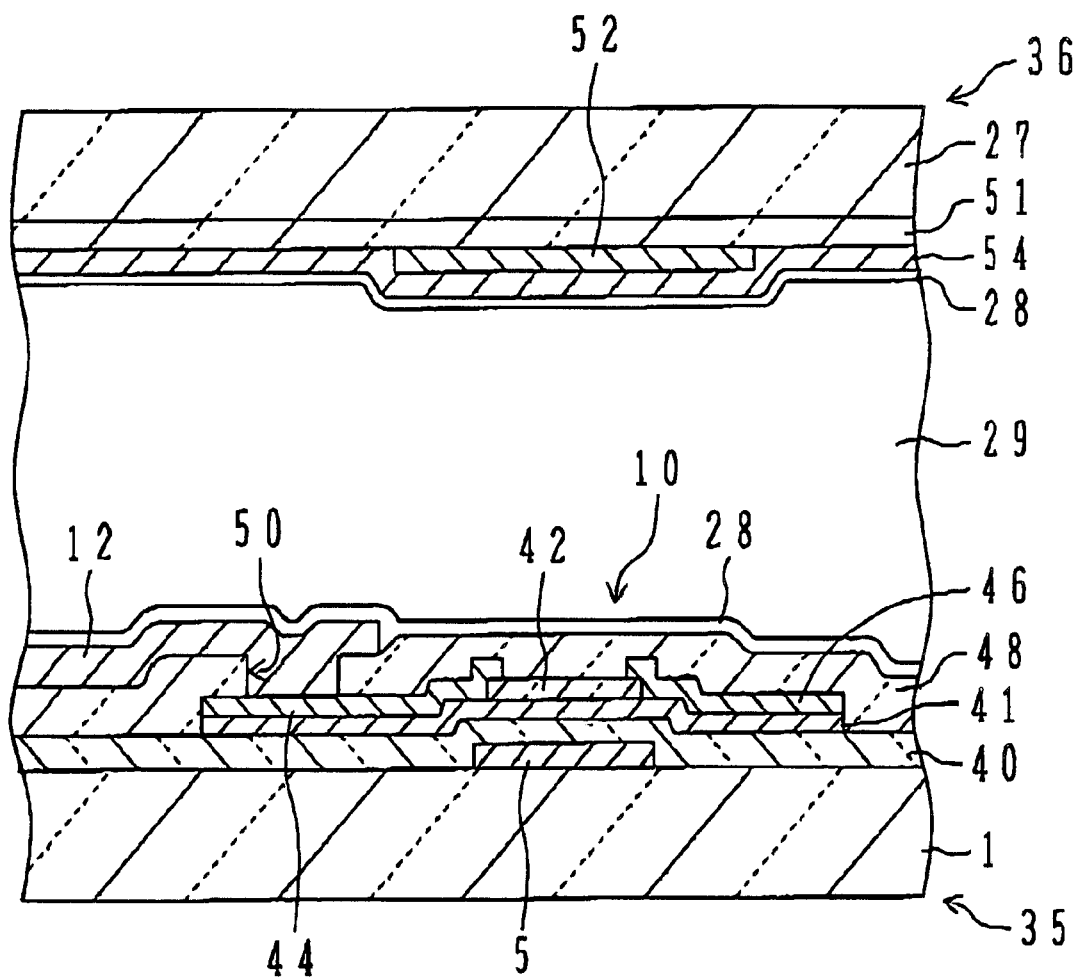
FIG. 2 is a cross-sectional view showing a TFT section of the liquid-crystal display of the first embodiment.
Figure 3:
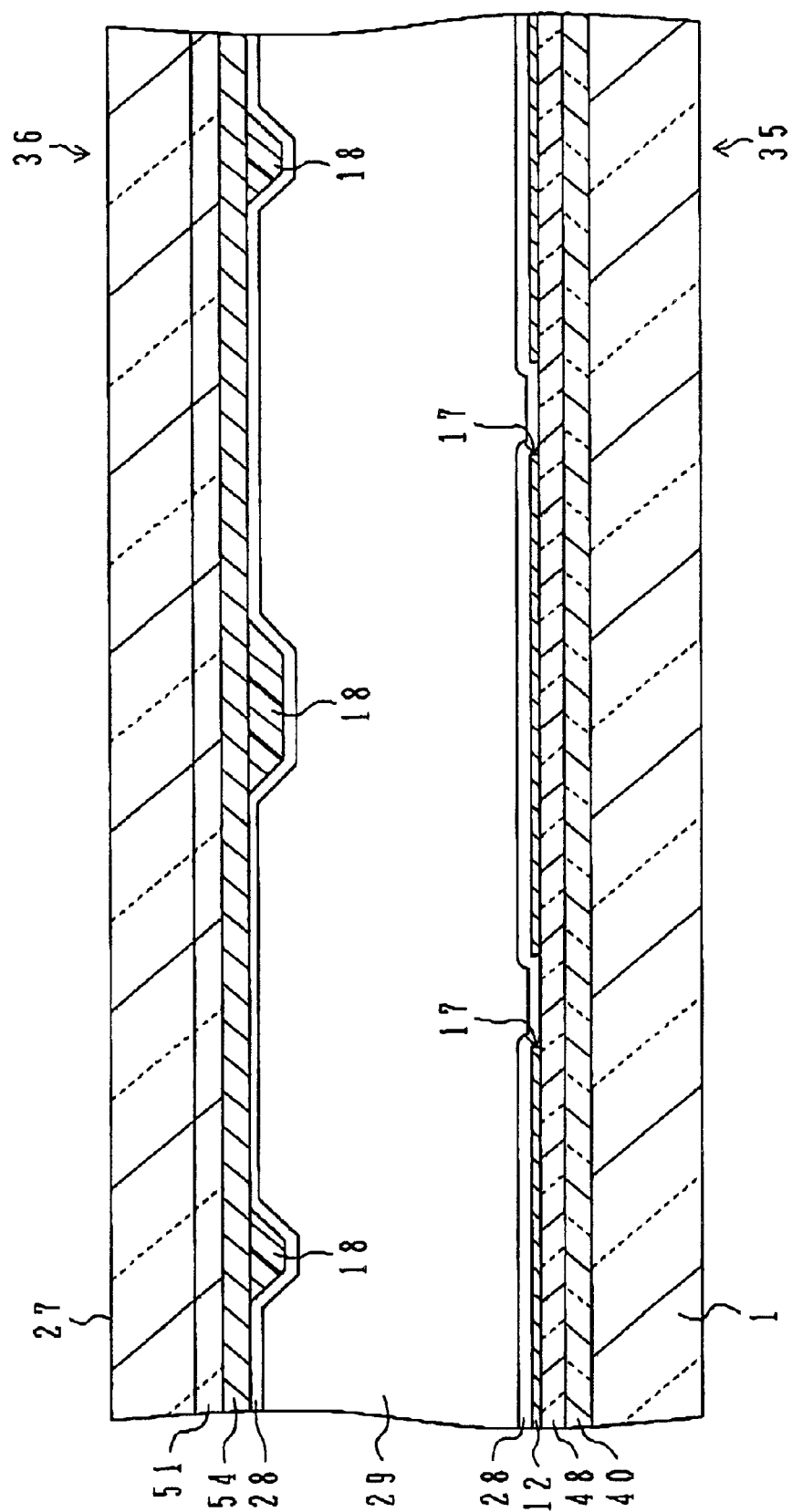
FIG. 3 is a cross-sectional view showing a section of a pixel electrode in the liquid-crystal display of the first embodiment.

FIG. 2 shows a cross section of the TFT section along one-dot chain line A2—A2 of FIG. 1. FIG. 3 shows a cross section of the pixel electrode section along one-dot chain line A3—A3 of FIG. 1. A TFT substrate 35 and an opposing substrate 36 are arranged in parallel to each other with a predetermined gap therebetween.

First, structure of the TFT substrate 35 will be described. A gate bus line 5 is formed on an opposing surface of the glass substrate 1. After depositing an aluminum layer of 100 nm thickness and a titanium later of 50 nm thick by sputtering, the two layers are patterned to form the gate bus line 5. The aluminum and titanium layers are etched by reactive ion etching using a mixed gas of boron chloride ($BCl_3$) and chlorine ($Cl_2$).

A gate insulating film 40 is formed on the glass substrate 1 to cover the gate bus line 5. The gate insulating film 40 is a silicon nitride (SiN) film of 400 nm thick formed by plasma enhanced chemical vapor deposition (PE-CVD).

An active region 41 is formed on a surface of the gate insulating film 40 so as to lie across the gate bus line 5. The active region 41 is a non-doped amorphous silicon layer of 30 nm thick and is formed by PE-CVD. Of the surface of the active region 41, a channel protecting layer 42 is formed in an area above the gate bus line 5. The channel protecting layer 42 is a silicon nitride (SiN) film of 140 nm thickness. In FIG. 1, the channel protecting layer 42 is patterned to cover the channel region of the TFT 10.

The channel protecting layer 42 is formed as follows. A surface of the silicon nitride layer is first covered with a photo resist film. Using the gate bus line 5 as a photo mask, the photo resist film is exposed to light from a rear surface of the glass substrate 1. This defines edges of the resist pattern, the edges being parallel to the row direction of FIG. 1. Edges thereof parallel to the column direction of FIG. 1 are defined in another exposure process using an ordinary photo mask.

The photo resist film is developed and is then etched using a buffered hydrofluoric acid based etchant to thereby pattern the silicon nitride layer. This patterning may be conducted by reactive ion etching (RIE) using a fluorine based gas. After the silicon nitride layer is patterned, the resist pattern is removed.

A source electrode 44 and a drain electrode 46 are formed on respective areas, on the upper surface of the active region 41, on both sides of the channel protecting layer 42. The source electrode 44 and the drain electrode 46 are formed using a laminated structure in which an $n^+$-type amorphous silicon layer of 30 nm thick, a titanium film of 20 nm thick, an aluminum layer of 75 nm thick, and a titanium layer of 80 nm thick are deposited in this order. The gate bus line 5, the gate insulating film 40, the active region 41, the source electrode 44, and the drain electrode 46 constitute a TFT 10.

The active region 41, the source electrode 44, and the drain region 46 are patterned using one etching mask. These layers are etched by RIE using a mixed gas of boron chloride ($BCl_3$) and chlorine ($Cl_2$). In the RIE, the channel protecting layer 42 serves as an etching stopper layer above the gate bus line 5.

A pixel electrode 12 is formed on the protective insulating film 48. The pixel electrode 12 is a 70 nm thick indium tin oxide (ITO) film connected to the source electrode 44 via a contact hole 50 passing through the protective insulating film 48. A slit 17 is formed in the pixel electrode 12 as shown in FIG. 3. The ITO film is formed by DC magnetron sputtering. The ITO film is patterned by wet etching using an oxalic acid based etchant. The pixel electrode 12 and the protective insulating film 48 are covered with an alignment film 28.

Next, the structure of the opposing substrate 36 will be described. A color filter 51 is formed on an opposing surface of a glass substrate 27. On a surface of the color filter 51, a light shielding film 52 of chromium or the like is formed in a region opposing the TFT 10. A common electrode 54 of ITO is formed on a surface of the color filter 51 to cover the light shielding film 52. A protrusion pattern 18 is formed on a surface of the common electrode 54. The protrusion pattern 18 is made of, for example, a polyimide-based photo resist. Surfaces of the protrusion pattern 18 and the common electrode 54 are covered with the alignment film 28.

Figure 4:
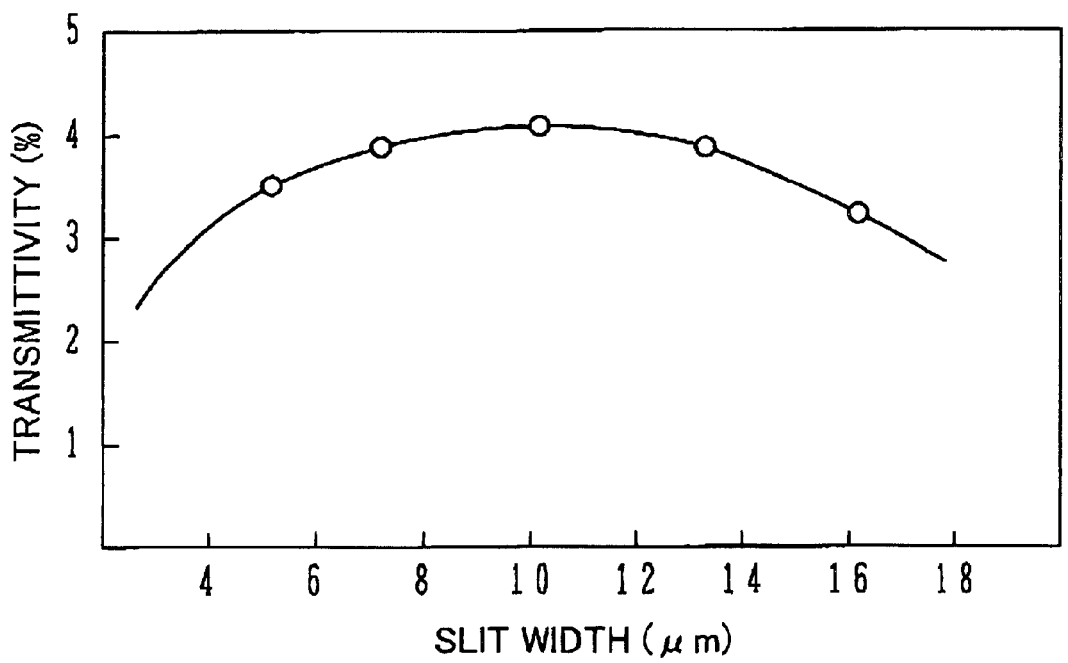
FIG. 4 is a graph showing a relationship between a width of a slit formed in a pixel electrode and a transmittance.
Figure 11A:
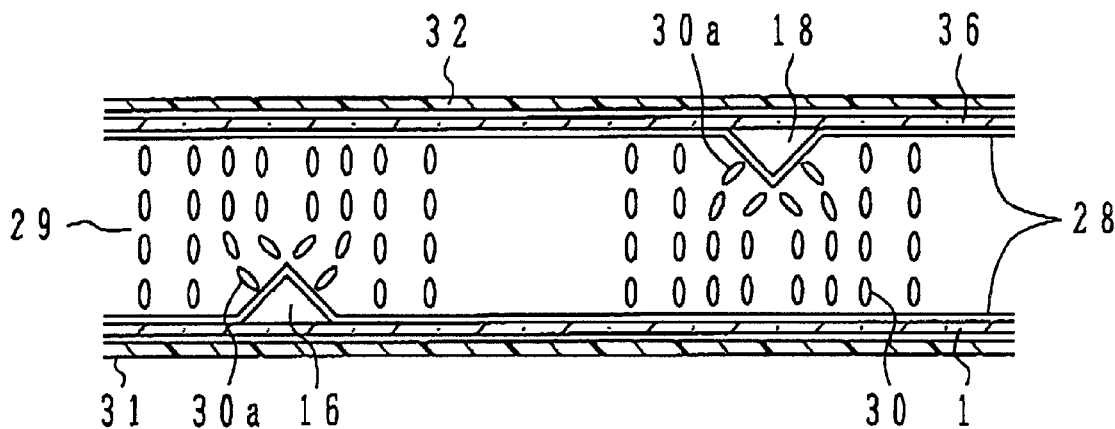
FIGS. 11A and 11B are cross-sectional views in the non-voltage-applied state and in the voltage-applied state to explain the effect of the protrusion pattern.
Figure 11B:
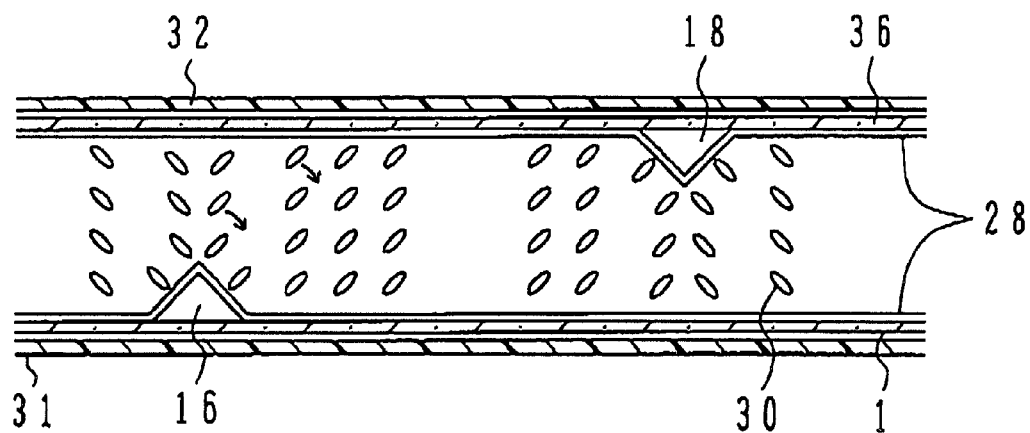

FIG. 4 shows a relationship between the width of the slit 17 formed in the pixel electrode 12 and the transmittance. The abscissa represents the slit width in micrometers ($\mu$m) and the ordinate represents the transmittance in percent (%). The values of the transmittance indicated in this graph are those obtained when the liquid-crystal panel provided with the polarizers 31 and 32 of FIG. 11 is in the white display state.

When the slit width is about 10 $\mu$m, the transmittance takes a maximum value. When the slit width exceeds 10 $\mu$m, the transmittance lowers. It can be considered that this is caused by decrease in the opening ratio. When the slit width is less than 10 $\mu$m, the transmittance lowers. It can be considered that this is caused by decrease in the regulating force to align the liquid-crystal molecules.

In the first embodiment shown in FIG. 1, the slit 17 in the pixel electrode 12B of the blue pixel is 10 $\mu$m wide and the slit 17 in each of the pixel electrodes 12R and 12G respectively of the red and green pixels is 7 $\mu$m. That is, the slit widths are set to maximize the transmittance of the blue pixel.

When the cell gap ranges from 4 $\mu$m to 4.5 $\mu$m, the transmittance of the blue pixel relatively lowers. In the first embodiment, the slit widths respectively of the red and green pixels are shifted from the optimal values. In this way, by relatively lowering the transmittance of the red and green pixels as compared with the transmittance of the blue pixel, the decrease in the transmittance of the blue pixel caused by the wavelength dispersion of the birefringence effect is compensated for. This reduces the difference among the transmittance of the red, green, and blue pixels, and hence the coloring of the display screen can be decreased in the white display state.

Figure 5:
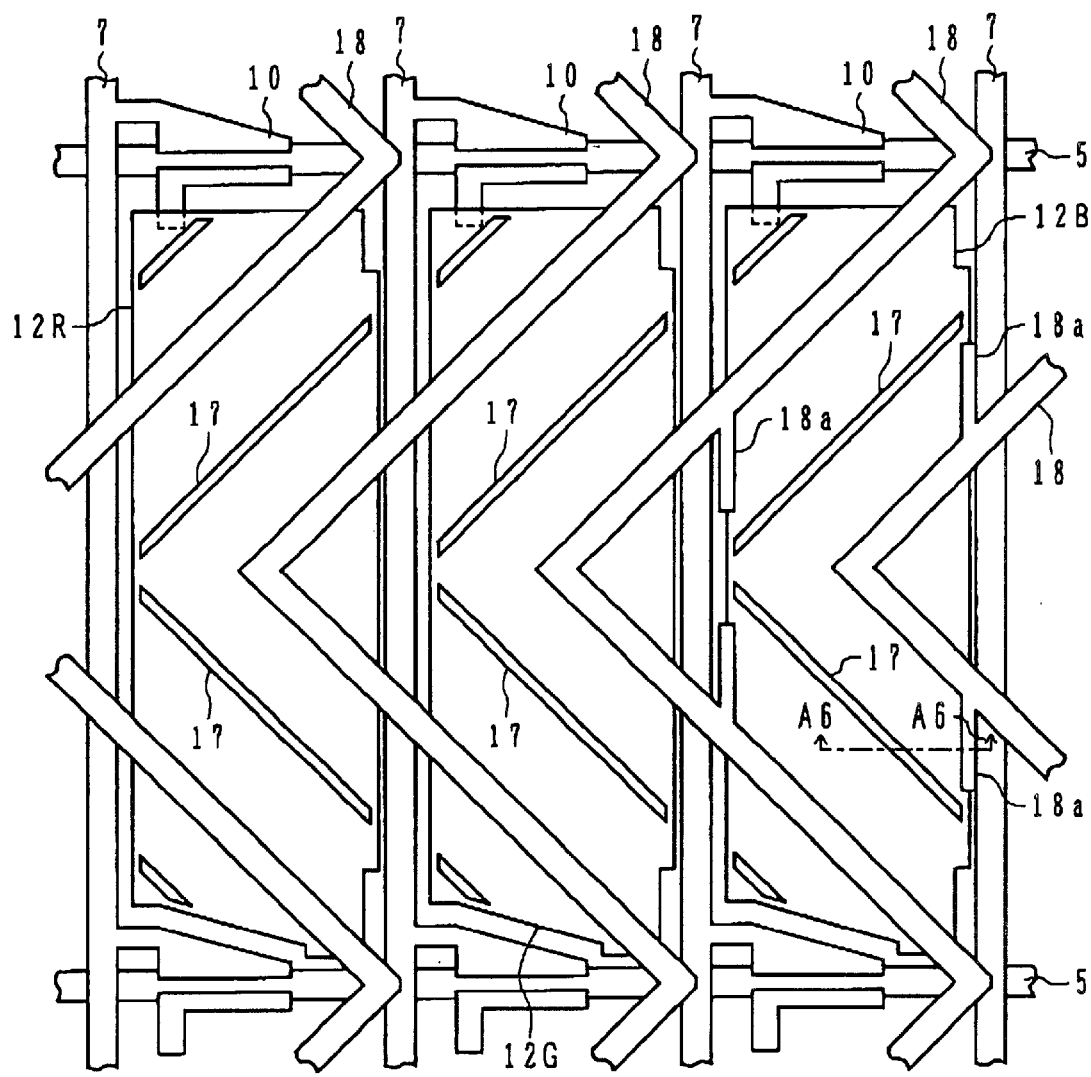
FIG. 5 is a plan view partly showing a liquid-crystal display in a second embodiment.
Figure 6A:
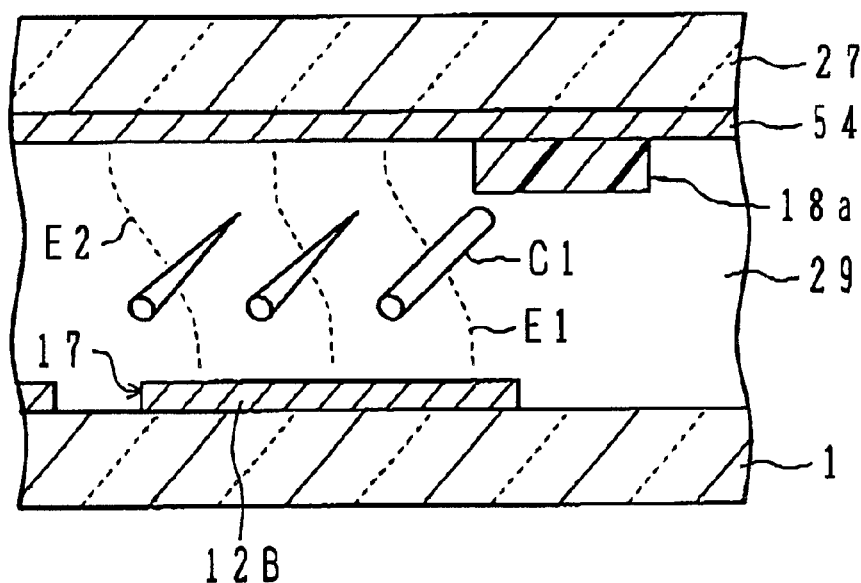
FIG. 6A is a schematic cross-sectional view showing an end section of a pixel electrode in the liquid-crystal display of the second embodiment and FIG. 6B is a schematic cross-sectional view showing an end section of a pixel electrode in the liquid-crystal display of the prior art.
Figure 6B:
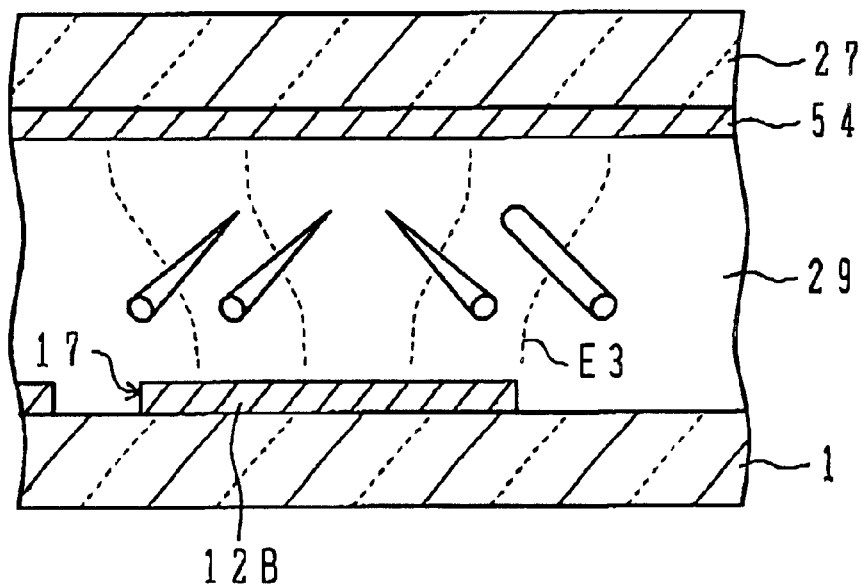

Referring next to FIGS. 5, 6A, and 6B, description will be given of a second embodiment. In the first embodiment, the transmittance is changed by adjusting the slit formed in the pixel electrode. In the second embodiment, the slit widths for the red, green, and blue pixels are the same, and the transmittance is changed according to the arrangement of protrusion patterns formed on the opposing substrate.

FIG. 5 is a plan view of a liquid-crystal display in the second embodiment. Description will be given only of different points of the second embodiment as compared with the structure of the liquid-crystal display in the first embodiment. In the second embodiment, the slit 17 of the pixel electrode 12B of the blue pixel is substantially equal in the slit width to the slits 17 of the red and green pixels. A protrusion pattern 18a branching from the protrusion pattern 18 is formed on an opposing surface of the opposing substrate. The protrusion patterns 18a are arranged on the edge of the pixel electrode 12B at locations in which the slit 17 and the edge form an acute angle therebetween.

FIG. 6A shows a schematic cross-sectional view along one-dot chain line A6—A6 of FIG. 5. A pixel electrode 12B is formed on an opposing surface of a glass substrate on which TFT's are formed. On the opposing substrate, a protrusion pattern 18a is formed on a surface of a common electrode 54. The protective insulating film, the alignment film, and the like are not shown in FIG. 6A.

The protrusion pattern 18a has lower permittivity than a liquid-crystal material 29. Therefore, an electric force line E1 from the right end of the pixel electrode 12B to the common electrode 54 curves to the left side in FIG. 6A as it approaches the common electrode 54 to avoid the protrusion pattern 18a. Also, an electric force line E2 from the end section on the slit side of the pixel electrode 12B to the common electrode 54 curves to the left side in FIG. 6A as it approaches the common electrode 54. Consequently, the liquid-crystal molecules between the slit 17 and the protrusion pattern 18a of FIG. 6A tilt so as to direct to an upper-right corner in the cross-sectional view of FIG. 6A.

FIG. 6B shows a cross-sectional view of the same section as that shown in FIG. 6A. However, the extrusion pattern 18a is absent in FIG. 6B. In this situation, an electric force line E3 from the right end of the pixel electrode 12B to the common electrode 54 draws a curve toward the right side in FIG. 6B as it approaches the common electrode 54. Therefore, the liquid-crystal molecules in the neighborhood of the right end of the pixel electrode 12B tilt so as to direct to an upper-left corner in the cross-sectional view of FIG. 6B.

The tilt direction of the liquid-crystal molecules in the neighborhood of the slit 17 is substantially opposite to that of the tilt direction of the liquid-crystal molecules in the neighborhood of the right end of the pixel electrode 12B illustrated in FIG. 6B. Therefore, the alignment of liquid-crystal molecules is disturbed. This lowers the transmittance in the white display state.

By disposing the protrusion pattern 18a as shown in the second embodiment, the disturbance of the alignment of liquid-crystal molecules can be prevented and the transmittance is resultantly increased. As shown in FIG. 5, the protrusion pattern 18a is disposed only for the blue pixel in the second embodiment. Therefore, it is possible to increase the transmittance of the blue pixel in the white display state to close to the transmittance of the red and green pixels. Resultantly, the coloring of the display screen can be decreased in the white display state.

Figure 7:
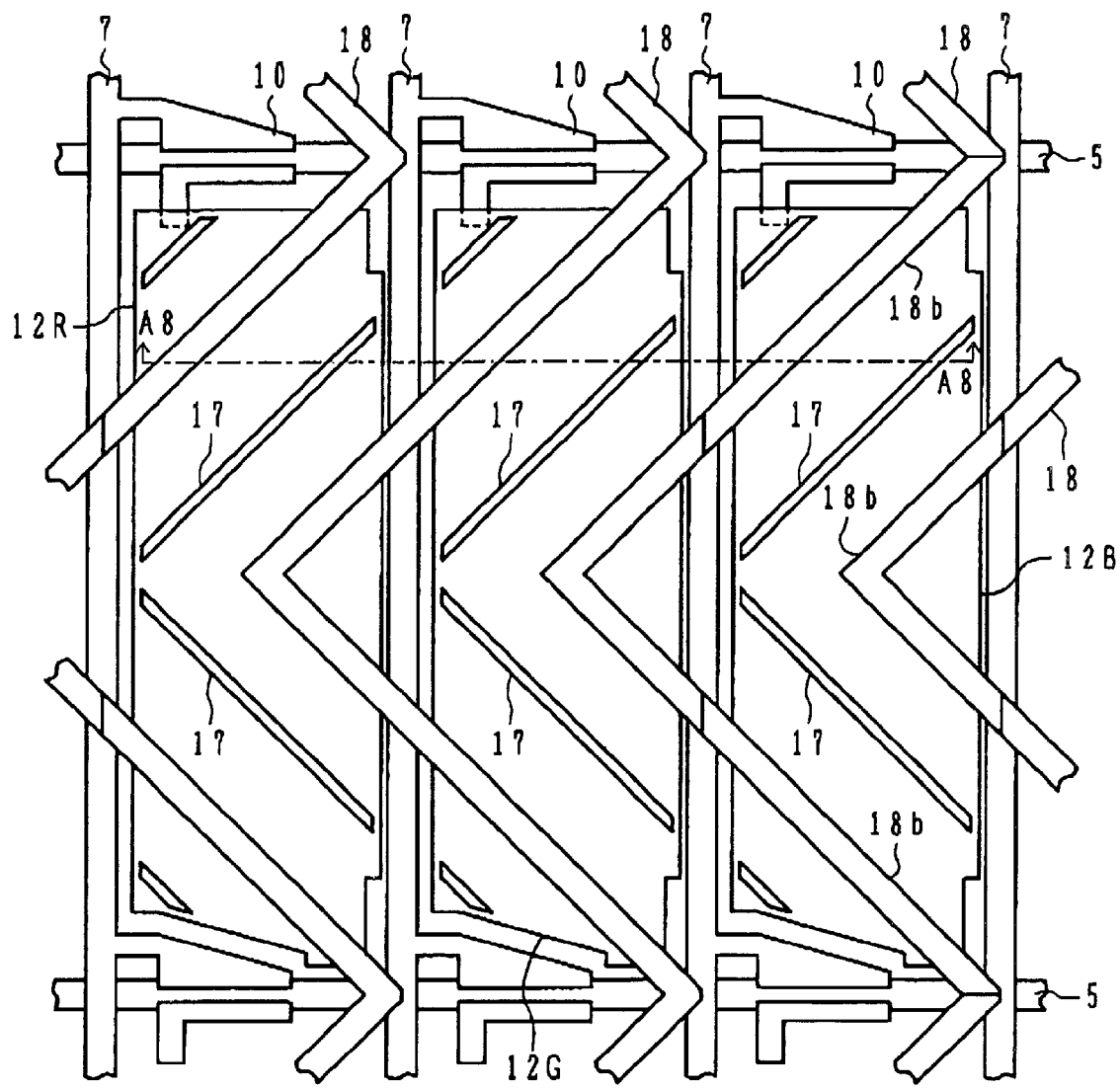
FIG. 7 is a plan view partly showing a liquid-crystal display in a third embodiment.
Figure 8:
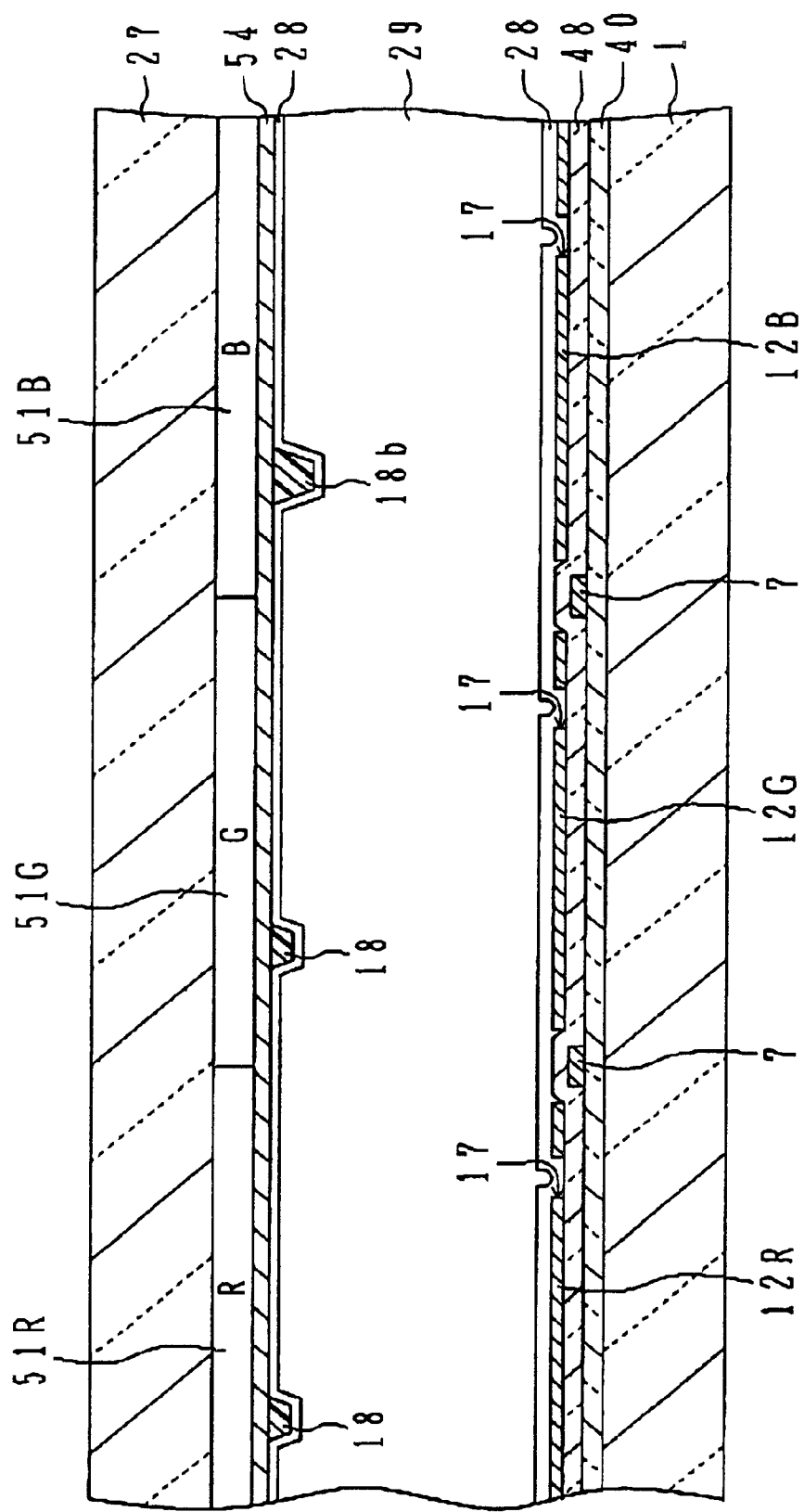
FIG. 8 is a cross-sectional view partly showing the liquid-crystal display of a third embodiment.
Figure 9:
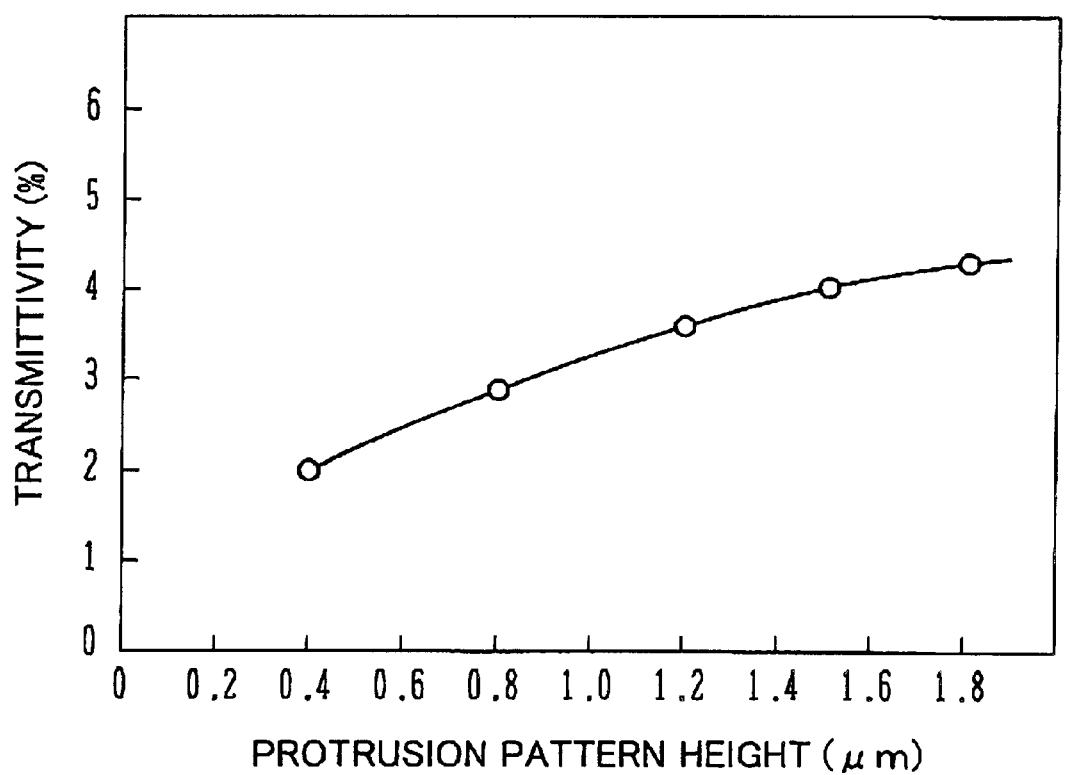
FIG. 9 is a graph showing a relationship between height of a protrusion pattern formed on a substrate on which a common or shared electrode is formed and a transmittance.
Figure 10A:
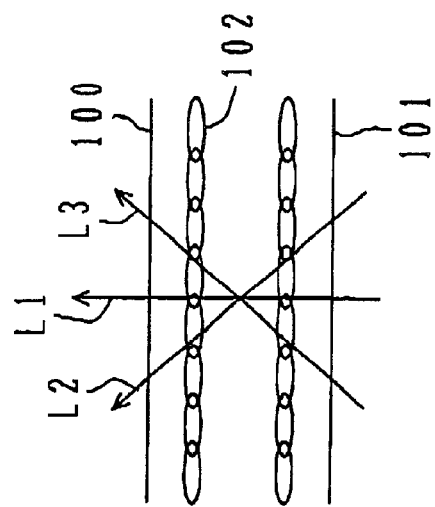
FIGS. 10A to 10C are schematic cross-sectional view of a liquid-crystal display to explain the visual angle characteristic of a homeotropic liquid-crystal display in the prior art.
Figure 10B:
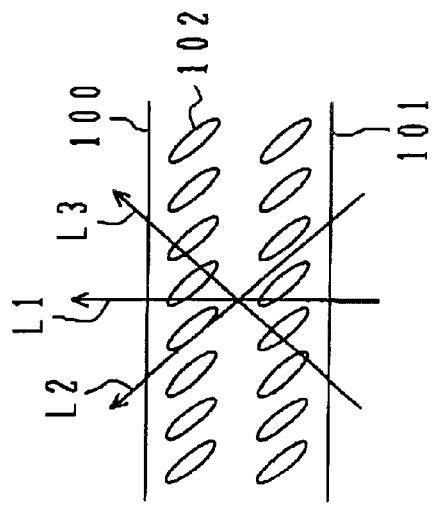
Figure 10C:
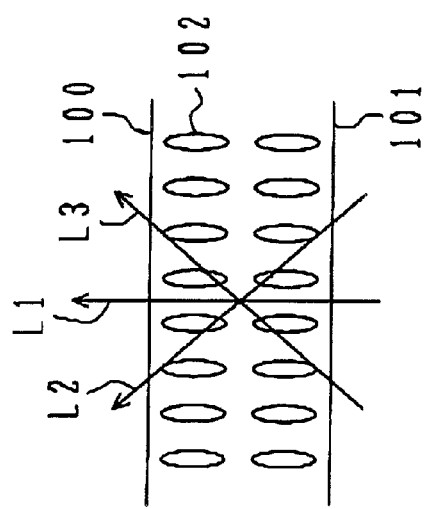

Referring next to FIGS. 7 to 9, description will be given of a third embodiment. In the first embodiment, the transmittance is changed by adjusting the width of the slit formed in the pixel electrode. In the third embodiment, the transmittance is changed by changing height of the protrusion pattern formed in the opposing substrate.

FIG. 7 is a plan view of a liquid-crystal display in the third embodiment. Description will be given only of different points of the third embodiment as compared with the structure of the liquid-crystal display in the first embodiment. In the third embodiment, like in the second embodiment, the slit 17 of the pixel electrode 12B of the blue pixel is substantially equal to the slit width of the slits 17 of the red and green pixels. While the protrusion pattern 18 has a fixed height in the first embodiment, the protrusion pattern 18 in the blue pixel is higher than those in the other pixels.

FIG. 8 is a cross-sectional view along one-dot chain line A8—A8 of FIG. 7. A gate insulating film 40 is formed on an opposing surface of a TFT glass substrate 1. A drain bus line 7 is formed on the gate insulating film 40. Surfaces of the drain bus line 7 and the gate insulating film are covered with a protective insulating film 48. Pixel electrodes 12R, 12G, and 12B are formed on the protective insulating film 48. Surfaces of the pixel electrodes are covered with an alignment film 28.

On an opposing surface of a glass substrate 27, color filters 51R, 51G, and 51B are formed. A common electrode 54 is formed on surfaces of the color filters 51R, 51G, and 51B. On a surface of the common electrode 54, protrusion patterns 18 and 18a are formed. The protrusion pattern 18a in the blue pixel has a height of 1.5 $\mu$m, and the protrusion patterns 18 in the red and green pixels have a height of 1.2 $\mu$m. The common electrode 54 and the protrusion patterns 18 and 18a are covered with the alignment film 28.

In the process of forming the protrusion pattern 18a in the blue pixel, a resist film is first patterned to form protrusion patterns in the red and green pixels. Thereafter, a thicker resist film is formed and is then patterned to resultantly form the protrusion pattern 18a.

Figure 12:
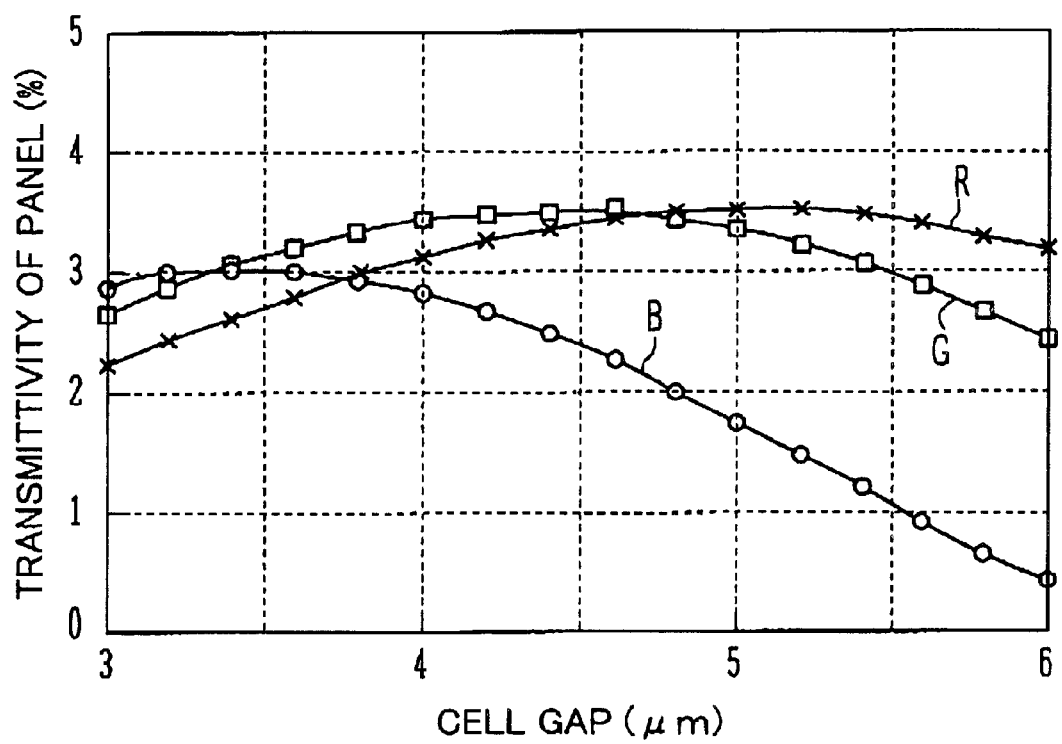
FIG. 12 is a graph showing a relationship between a cell gap and a transmittance for each of the red, green, and blue pixels.

FIG. 9 shows a relationship between the height of the protrusion pattern and the transmittance. The abscissa represents the height of the protrusion pattern in micrometer ($\mu$m) and the ordinate represents the transmittance in percent (%). The transmittance increases as the protrusion pattern becomes higher. The protrusion pattern in the blue pixel is higher in the third embodiment, and hence the transmittance is higher in the blue pixel than in the other pixels. Resultantly, the reduction of the transmittance in the blue pixel described in FIG. 12 can be compensated for, and the coloring of the display screen can be decreased in the white display state.

In the embodiment, the coloring of the display screen is decreased in the white display state by setting the transmittance of the blue pixel larger than the transmittance of the red and green pixels. In a liquid-crystal display with an image display area having a diagonal of ten inches or more, the cell gap tends to be greater in the peripheral sections than in the central section. When the cell gap becomes greater, the difference in retardation is increased among the red, green, and blue pixels. This easily leads to the coloring of the display screen in the peripheral sections. For example, the coloring easily takes place in the peripheral zone of the screen up to about three centimeters from the edge of the screen.

The structure of the embodiments may be applied only to the peripheral zone of the screen to relatively increase the transmittance of the blue pixel. In the first and third embodiments, the slit width or the height of the protrusion pattern in the red and green pixels is shifted from the optimal values to relatively increase the transmittance of the blue pixel. Therefore, the transmittance of each of the red and green pixels is smaller than the maximum transmittance obtained when the conditions above are optimized. By applying the configuration to increase the transmittance of the blue pixel only to the peripheral zone of the screen, the transmittance of each pixel can be maximized in the central section of the screen.

For example, in the first embodiment, the slit width varies among the pixels in the peripheral zone and is substantially fixed for the pixels in the central zone. The expression "substantially fixed" implies an error range in consideration of fluctuation in the quality of liquid-crystal displays produced.

For example, in the second embodiment, the protrusion patterns 18a of FIG. 5 are primarily arranged in pixels in the peripheral zone. For example, in the third embodiment, the height of the protrusion patterns is changed primarily in the peripheral zone. The expression "primarily" implies that the structure is used for pixels in the peripheral zone such that the adoption of the structure to relatively increase the transmittance of the blue pixel leads to the advantageous effect. The structure is not used in the central zone. Or, even if the structure is used in the central zone, the density of the pixels in which the structure is used is smaller in the central zone than in the peripheral zone.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A liquid-crystal display, comprising:
   a first substrate and a second substrate disposed in parallel to said first substrate with a gap therebetween;
   liquid-crystal material filled in a space between said first and second substrates, said liquid-crystal material having a negative dielectric constant anisotropy;
   an alignment film for homeotropically aligning liquid-crystal molecules of said liquid-crystal material in a non-electric field state in which an electric field is not applied to said liquid-crystal material;
   pixel electrodes formed on an opposing surface of said first substrate, said pixel electrodes defining pixels regularly arranged in a direction of rows and in a direction of columns, each said pixel electrode having a slit therein;
   a common electrode formed on an opposing surface of said second substrate;
   a color filter disposed for each said pixel for giving a color of red, green, or blue thereto; and
   protrusion patterns disposed on said opposing surface of said second substrate, each said protrusion pattern being disposed to divide an area of said pixel into a plurality of sub-areas when viewed in a direction of a normal of said substrates, wherein
      said slit of said pixel electrode is disposed apart from said protrusion pattern by a gap when viewed in a direction of a normal of said substrates, said slit and said protrusion patterns divide an area of said pixel into a plurality of domains, and
      said slits belonging to at least one selected from three groups of red, green, and blue pixels have width different from those of said slits of other pixel groups.

2. A liquid-crystal display according to claim 1, further comprising:
   a pair of polarizers respectively arranged on outer surfaces respectively of said first and second substrates, each said polarizer having a polarization axis of which a direction is adjusted to display black in a non-voltage-applied state; and
   among said red, green, and blue pixels in a voltage-applied state, difference in transmittance with respect to wavelength ranges of colors respectively corresponding to said red, greed, and blue pixels is less than that when said slits formed in said pixel electrodes has a same width.

3. A liquid-crystal display according to claim 1, wherein:
   in a peripheral zone of an image display area in which said pixels are arranged in a matrix form, said slit of at least one of three groups of said red, green, and blue pixels has slit width different from those of said slits of other groups; and
   in a central zone of said image display area, said widths are mutually and substantially equal to each other.

4. A liquid-crystal display according to claim 1, wherein said slit width of said blue pixels is wider than those of said red and green pixels.

5. A liquid-crystal display, comprising:
   a first substrate and a second substrate disposed in parallel to said first substrate with a gap therebetween;
   liquid-crystal material filled in a space between said first and second substrates, said liquid-crystal material having a negative dielectric constant anisotropy;
   an alignment film for homeotropically aligning liquid-crystal molecules of said liquid-crystal material in a non-electric field state in which an electric field is not applied to said liquid-crystal material;
   pixel electrodes formed on an opposing surface of said first substrate, said pixel electrodes defining pixels regularly arranged in a direction of rows and in a direction of columns;
   a common electrode formed on an opposing surface of said second substrate;
   a color filter disposed for each said pixel for giving a color of red, green, or blue thereto;
   first protrusion patterns disposed on said opposing surface of said second substrate, each said first protrusion pattern being disposed to divide an area of said pixel into a plurality of sub-areas when viewed in a direction of a normal of said substrates;
   a domain boundary restricting member formed on said opposing surface of said first substrate apart from said protrusion pattern by a gap when viewed in a direction of a normal of said substrates, said domain boundary restricting member defining, in cooperation with said first protrusion patterns when a voltage is developed across said pixel electrode and said common electrode, boundaries of domains, in each domain said liquid-crystal molecules tilting in a same direction; and
   a second protrusion pattern formed on said opposing surface of said second substrate, said second protrusion pattern extending, along a section of an edge of said pixel electrodes, only for said pixels belonging to one or two pixel groups selected from three pixel groups of said red, green, and blue pixels.

6. A liquid-crystal display according to claim 5, wherein said second protrusion pattern is arranged in said pixels primarily in a peripheral zone of an image display area in which said pixels are arranged in a matrix form.

7. A liquid-crystal display according to claim 5, wherein said second protrusion pattern is arranged only in said pixels belonging to said blue pixel group.

8. A liquid-crystal display, comprising:
   a first substrate and a second substrate disposed in parallel to said first substrate with a gap therebetween;
   liquid-crystal material filled in a space between said first and second substrates, said liquid-crystal material having a negative dielectric constant anisotropy;
   an alignment film for homeotropically aligning liquid-crystal molecules of said liquid-crystal material in a non-electric field state in which an electric field is not applied to said liquid-crystal material;
   pixel electrodes formed on an opposing surface of said first substrate, said pixel electrodes defining pixels regularly arranged in a direction of rows and in a direction of columns;
   a common electrode formed on an opposing surface of said second substrate;
   a color filter disposed for each said pixel for giving a color of red, green, or blue thereto;

protrusion patterns disposed on said opposing surface of said second substrate, each said protrusion pattern being disposed to divide an area of said pixel into a plurality of sub-areas when viewed in a direction of a normal of said substrates, said protrusion patterns in said pixels belonging to at least one selected from three pixel groups of said red, green, and blue pixels having height different from height of said protrusion patterns in said pixels belonging to other pixel groups; and a domain boundary restricting member formed on said opposing surface of said first substrate apart from said protrusion pattern by a gap when viewed in a direction of a normal of said substrates, said domain boundary restricting member defining, in cooperation with said protrusion patterns when a voltage is applied across said pixel electrode and said common electrode, boundaries of domains, in each domain said liquid-crystal molecules tilting in a same direction.

9. A liquid-crystal display according to claim 8, wherein said protrusion patterns in said blue pixels have height different from height of said protrusion patterns in said pixels belonging to other pixel groups.

10. A liquid-crystal display according to claim 8, wherein primarily in a peripheral zone of an image display area in which said pixels are arranged in a matrix form, said protrusion patterns in said pixels belonging to at least one selected from three pixel groups of said red, green, and blue pixels have height different from height of said protrusion patterns in said pixels belonging to other pixel groups.

* * * * *

UNITED STATES PATENT AND TRADEMARK OFFICE
CERTIFICATE OF CORRECTION

PATENT NO. : 6,424,398 B1  
DATED : July 23, 2002  
INVENTOR(S) : Yoji Taniguchi It is certified that error appears in the above-identified patent and that said Letters Patent is hereby corrected as shown below:

Column 9,
Line 57, delete "greed" and insert -- green --

Signed and Sealed this

Twenty-fifth Day of February, 2003

JAMES E. ROGAN
*Director of the United States Patent and Trademark Office*